(12) United States Patent
Giuliano

(10) Patent No.: US 11,936,300 B2
(45) Date of Patent: Mar. 19, 2024

(54) SWITCHED-CAPACITOR CIRCUIT CONTROL IN POWER CONVERTERS

(71) Applicant: pSemi Corporation, San Diego, CA (US)

(72) Inventor: David Giuliano, Brookline, MA (US)

(73) Assignee: pSemi Corporation, LLC, San Diego, CA (US)

( * ) Notice: Subject to any disclaimer, the term of this patent is extended or adjusted under 35 U.S.C. 154(b) by 111 days.

(21) Appl. No.: 17/491,983

(22) Filed: Oct. 1, 2021

(65) Prior Publication Data

US 2022/0131466 A1 Apr. 28, 2022

Related U.S. Application Data

(63) Continuation of application No. 16/872,207, filed on May 11, 2020, now Pat. No. 11,165,350, which is a continuation of application No. 14/857,141, filed on Sep. 17, 2015, now Pat. No. 10,686,380, which is a continuation of application No. 14/309,003, filed on Jun. 19, 2014, now Pat. No. 9,143,037, which is a continuation of application No. PCT/US2012/070555, filed on Dec. 19, 2012.

(60) Provisional application No. 61/577,271, filed on Dec. 19, 2011.

(51) Int. Cl.
*H02M 3/158* (2006.01)
*H02M 1/00* (2006.01)
*H02M 3/07* (2006.01)

(52) U.S. Cl.
CPC ....... *H02M 3/1584* (2013.01); *H02M 1/0043* (2021.05); *H02M 3/07* (2013.01); *H02M 1/0058* (2021.05); *H02M 1/007* (2021.05); *H02M 3/1586* (2021.05)

(58) Field of Classification Search
CPC .............. H02M 1/0043; H02M 1/007; H02M 3/07–078; H02M 3/155–1588
See application file for complete search history.

(56) References Cited

U.S. PATENT DOCUMENTS

| | | | | |
|---|---|---|---|---|
| 2008/0024198 A1* | 1/2008 | Bitonti | ..... | H02M 3/07 327/536 |
| 2009/0039843 A1* | 2/2009 | Kudo | ..... | H02M 3/1584 323/272 |
| 2009/0059630 A1* | 3/2009 | Williams | ..... | H02M 3/1588 363/60 |
| 2009/0278520 A1* | 11/2009 | Perreault | ..... | H02M 3/07 323/282 |
| 2010/0237833 A1* | 9/2010 | Abe | ..... | H02M 3/1584 320/166 |
| 2012/0153912 A1* | 6/2012 | Demski | ..... | H02M 3/07 323/282 |
| 2014/0070787 A1* | 3/2014 | Arno | ..... | H02M 3/02 323/304 |

* cited by examiner

*Primary Examiner* — Fred E Finch, III
(74) *Attorney, Agent, or Firm* — Finnegan, Henderson, Farabow Garrett & Dunner LLP

(57) ABSTRACT

An apparatus for power conversion comprises a voltage transformation element, a regulating element, and a controller; wherein, a period of the voltage transformation element is equal to a product of a coefficient and a period of the regulating circuit, and wherein the coefficient is selected from a group consisting of a positive integer and a reciprocal of said integer.

54 Claims, 14 Drawing Sheets

SWITCHED-CAPACITOR CIRCUIT CONTROL IN POWER CONVERTERS

RELATED APPLICATIONS

This application is a continuation of U.S. application Ser. No. 14/309,003, filed on Jun. 19, 2014 and issued as U.S. Pat. No. 9,143,037 on Sep. 22, 2015, which is a continuation of PCT/US2012/070555, filed on Dec. 19, 2012 which claims the benefit of the priority date of U.S. Provisional Application No. 61/577,271 filed on Dec. 19, 2011, the contents of which are herein incorporated by reference.

FIELD OF DISCLOSURE

This disclosure relates to the control of power converters that utilize capacitors to transfer energy.

BACKGROUND

Power converters may generally include switches and one or more capacitors. Such converters can be used, for example, to power portable electronic devices and consumer electronics.

A switch-mode power converter is a specific type of power converter that regulates an output voltage or current by switching energy storage elements (i.e. inductors and capacitors) into different electrical configurations using a switch network.

A switched capacitor converter is a type of switch-mode power converter that primarily utilizes capacitors to transfer energy. In such converters, the number of capacitors and switches increases as the transformation ratio increases.

Typical power converters perform voltage transformation and output regulation. In many power converters, such as buck converters, both functions take place in a single stage. However, it is also possible to split these two functions into two specialized stages. Such two-stage power converter architectures feature a separate transformation stage and a separate regulation stage. The transformation stage transforms one voltage into another voltage, while the regulation stage ensures that the output voltage and/or output current of the power converter maintains desired characteristics.

For example, referring to FIG. 1, in one known power converter 10, a switched capacitor element 12A is electrically connected, at an input end thereof, to a voltage source 14. An input of a regulating circuit 16A is electrically connected to an output of the switched capacitor element 12A. A load 18A is then electrically connected to an output of the regulating circuit 16A. Such a converter is described in US Patent Publication 2009/0278520, filed on May 8, 2009, the contents of which are herein incorporated by reference.

Furthermore, a modular multi-stage power converter architecture is described in PCT Application PCT/2012/36455, filed on May 4, 2012, the contents of which are also incorporated herein by reference. The switched capacitor element 12A and the regulating circuit 16A can be mixed and matched in a variety of different ways. This provides a transformative integrated power solution (TIPS™) for the assembly of such power converters. As such, the configuration shown in FIG. 1 represents only one of multiple ways to configure one or more switched capacitor elements 12A with one or more regulating circuits 16A.

FIG. 2 illustrates a power converter 10A that receives an input voltage VIN from the voltage source 14 and produces an output voltage VO that is lower than the input voltage VIN. The power converter 10A is a particular embodiment of the power converter architecture illustrated in FIG. 1. The switched capacitor element 12A features a 2:1 dual-phase series-parallel switched capacitor network that includes power switches S1-S8 and pump capacitors C1-C2. In contrast, the regulating circuit 16A features a buck converter that includes a low-side switch SL, a high-side switch SH, a filter inductor L1, and a driver stage 51.

In the operation of the switched capacitor element 12A, the power switches S1, S3, S6, S8 and the power switches S2, S4, S5, S7 are always in complementary states. Thus, in a first network state, the power switches S1, S3, S6, S8 are open and the power switches S2, S4, S5, S7 are closed. In a second network state, the power switches S1, S3, S6, S8 are closed and the power switches S2, S4, S5, S7 are open. The switched capacitor element 12A cycles through the first network state and the second network state, resulting in an intermediate voltage VX that is one-half of the input voltage VIN.

Referring to FIG. 2, the switched capacitor element 12A is in the first network state when a first phase voltage VA is low and a second phase voltage VB is high. In contrast, the switched capacitor element 12A is in the second network state when the first phase voltage VA is high and the second phase voltage VB is low. The two phase voltages VA, VB are non-overlapping and have approximately a fifty percent duty cycle.

In the operation of the regulating circuit 16A, the low-side switch SL and the high-side switch SH chop the intermediate voltage VX into a switching voltage VLX. A LC filter receives the switching voltage VLX and generates the output voltage VO that is equal to the average of the switching voltage VLX. To ensure the desired output voltage VO, a regulation control voltage VR controls the duty cycle of the low-side switch SL and the high-side switch SH. Additionally, the driver stage 51 provides the energy to open and close the low-side and high-side switches SL, SH.

Previous disclosures treat the control of the switched capacitor element 12A and regulating circuit 16A separately. This has numerous disadvantages, one of which is that the intermediate voltage VX ripple will feed through to the output voltage VO. A possible solution to this problem is to create a feed-back control loop that is fast enough to attenuate the effect of the intermediate voltage VX ripple on the output voltage VO. To achieve this goal, the frequency of the regulating circuit 16A must be at a significantly higher frequency than the frequency of the switched capacitor element 12A.

Another possible solution to this problem would be to add a feed-forward control loop to the regulating circuit 16A. However, as was the case with the fast feed-back solution, the feed-forward solution will only be effective if the frequency of the regulating circuit 16A is significantly higher than the frequency of the switched capacitor element 12A. Therefore, both solutions place a severe frequency constraint on the switched capacitor element 12A and the regulating circuit 16A.

Furthermore, there is typically a dead-time interval DT between the first network state and the second network state of the switched capacitor element 12A. During the dead-time interval DT, all of the switches in the switched capacitor element 12A are open. This ensures a clean transition between the first network state and the second network state of the switched capacitor element 12A, and vice versa. If the regulating circuit 16A tries to draw current during the dead-time interval DT, a voltage 'glitch' will occur at the node between the switched capacitor element 12A and the regulating circuit 16A.

The voltage 'glitch' can be reduced through the use of a glitch capacitor CX. Unfortunately, a portion of the energy stored on the glitch capacitor CX is thrown away each time the switched capacitor element 12A transitions between the first network state and the second network state, and vice versa. The energy loss is a result of the glitch capacitor CX being shorted to capacitors at a different voltage, such as pump capacitors C1, C2. Therefore, the use of a glitch capacitor CX to supply energy during the dead-time interval DT is an effective solution, but requires one additional capacitor and reduces the efficiency of the power converter 10A.

SUMMARY

In one aspect, the invention features an apparatus for power conversion. Such an apparatus includes a first element configured to accept an input signal having a first voltage and to output an intermediate signal having a second voltage, and a second element configured to receive the intermediate signal from the first element and to output an output signal having a third voltage. The first element is either a voltage transformation or a regulating element. The second element is a regulating element when the first element is a voltage transformation element and a voltage transformation element otherwise. A controller is configured to control a period of the voltage transformation element and a period of the regulating element. The controller is configured to synchronize the period of the voltage transformation element with a product of a coefficient and the period of the regulating element. This coefficient can be either a positive integer or a reciprocal of the integer.

In some embodiments, the coefficient is a positive integer, whereas in others, it is a reciprocal of the positive integer.

Embodiments also include those in which the controller receives the intermediate signal from the first element and the output signal from the second element. Among these are those in which the controller receives the input signal, and also those in which the controller generates a first control signal based on the output signal and sends the first control signal to the regulating element. This embodiment also includes within its scope alternative embodiments in which the controller generates a second control signal based on the intermediate signal and the first control signal, and sends the second control signal to the voltage transformation element.

Also included within the scope of the invention are those embodiments in which the controller provides linear voltage-mode control, and those in which it provides peak current-mode control.

In some embodiments, regulating element passes continuous current therethrough, whereas in others, the regulating element passes discontinuous current therethrough.

In other embodiments, the voltage transformation element includes voltage transformation sub-elements and the regulating element includes regulating sub-elements, and each voltage transformation sub-element is associated with a corresponding one of the regulating sub-elements.

Embodiments also include those in which the first element includes a voltage transformation element and those in which the first element includes a regulating element.

In another aspect, the invention features an apparatus for power conversion, such an apparatus includes a voltage transformation element, a regulating element, and a controller. A period of the voltage transformation element is equal to a product of a coefficient and a period of the regulating circuit. The coefficient is either a positive integer or a reciprocal of the integer.

Embodiments include those in which the regulating element passes continuous current therethrough, and also those in which the regulating element passes discontinuous current therethrough.

In some embodiments, the controller controls multiple phases present in the regulating element and the voltage transformation element.

Other embodiments include a data processing unit and a memory unit, at least one of which is configured to consume power provided by the power converter circuit.

Additional embodiments include data processing unit, a display, and a wireless transmitter and receiver, at least one of which is configured to consume power provided by the power converter circuit.

DESCRIPTION OF THE FIGURES

The foregoing features of the circuits and techniques described herein, may be more fully understood from the following description of the figures in which.

DETAILED DESCRIPTION

The apparatus described herein provides a way to control the switched capacitor element 12A and the regulating circuit 16A in a modular multi-stage power converter architecture.

Before describing several exemplary embodiments of controllers for power converters that utilize capacitors to transfer energy, it should be appreciated that in an effort to promote clarity in explaining the concepts, references are sometimes made herein to specific controllers for power converters that utilize capacitors to transfer energy. It should be understood that such references are merely exemplary and should not be construed as limiting. After reading the description provided herein, one of ordinary skill in the art will understand how to apply the concepts described herein to provide specific controllers for power converters that utilize capacitors to transfer energy.

It should be appreciated that reference is also sometimes made herein to particular frequencies as well as to particular transformation voltage ratios. It should be understood that such references are merely exemplary and should not be construed as limiting.

Reference may also sometimes be made herein to particular applications. Such references are intended merely as exemplary and should not be taken as limiting the concepts described herein to the particular application.

Thus, although the description provided herein explains the inventive concepts in the context of particular circuits or a particular application or a particular frequency, those of ordinary skill in the art will appreciate that the concepts equally apply to other circuits or applications or frequencies.

Embodiments described herein rely at least in part on the recognition that by synchronizing the switched capacitor element 12A and the regulating circuit 16A, the intermediate voltage VX ripple effect on the output voltage VO and the voltage "glitch" can be minimized.

Figure 1:
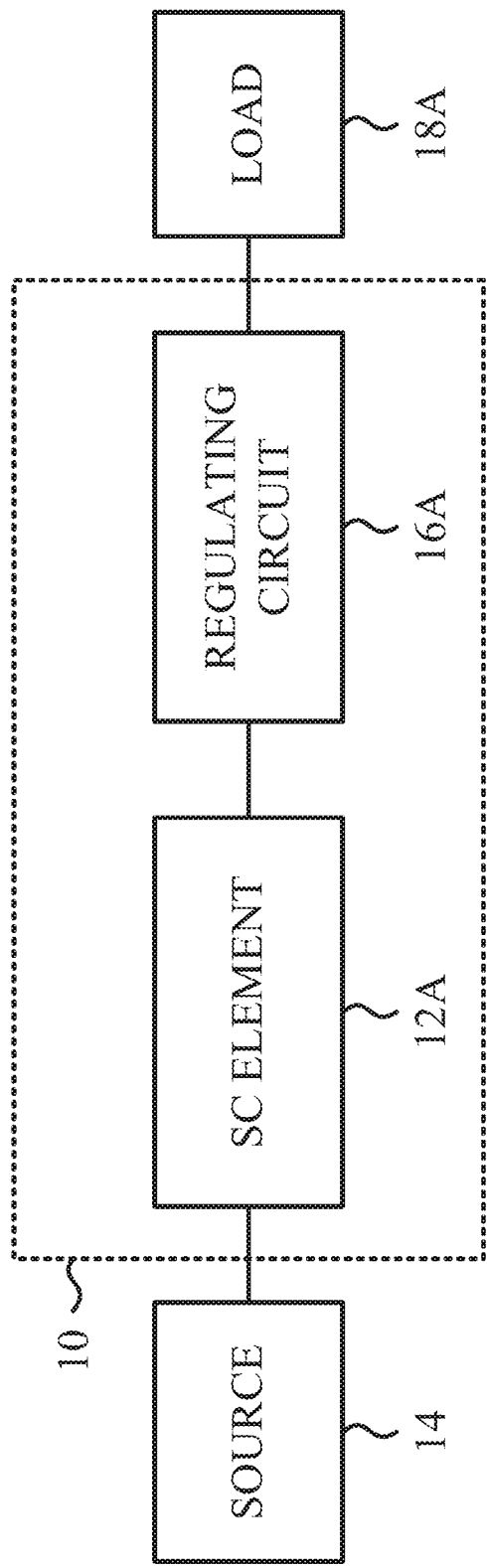
FIG. 1 shows a known power converter architecture.
Figure 2:
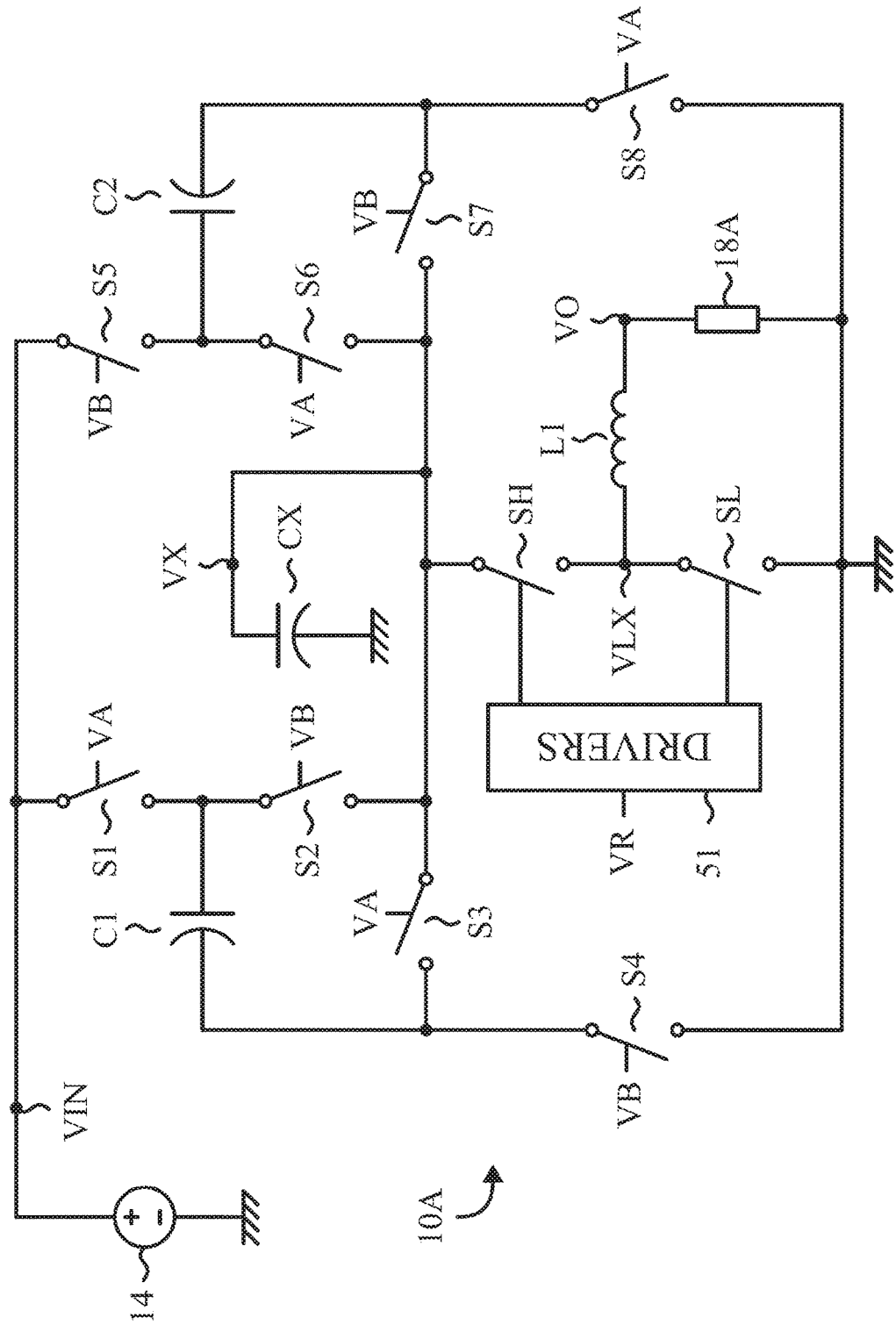
FIG. 2 shows a particular implementation of the power converter architecture in FIG. 1.
Figure 3:
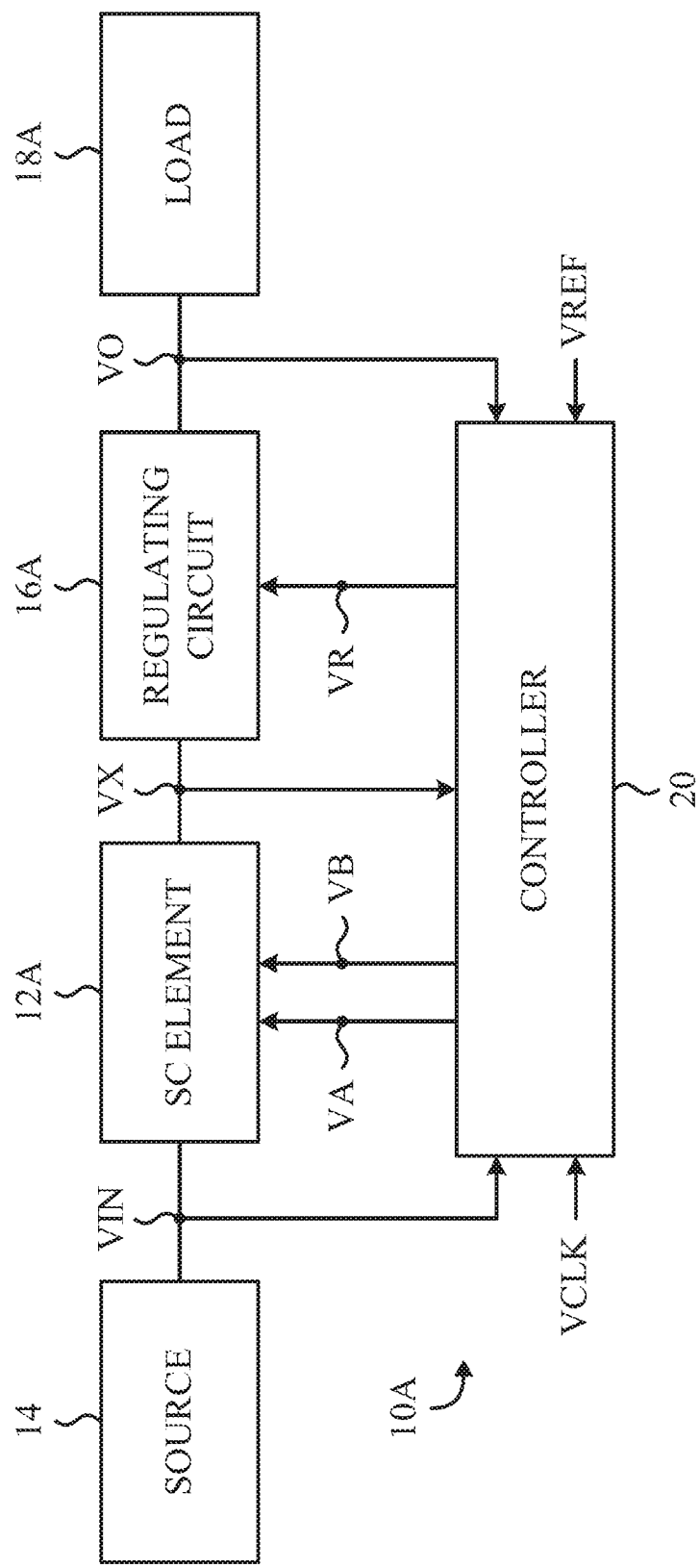
FIG. 3 shows a controller coupled to the power converter in FIG. 2.

FIG. 3 illustrates a first generic controller 20 that synchronizes the switched capacitor element 12A and the regulating circuit 16A within the power converter 10A shown in FIG. 2. The first generic controller 20 receives five input signals and provides three output signals. The input signals include the input voltage VIN, the output voltage VO, the intermediate voltage VX, a reference voltage VREF, and a clock voltage VCLK. The output signals include the regulation control voltage VR, the first phase voltage VA, and the second phase voltage VB. The clock voltage VCLK sets the period of the regulation control voltage VR and the reference voltage VREF sets the desired output voltage VO.

Synchronizing the switched capacitor element 12A with the regulating circuit 16A causes the intermediate voltage VX ripple to be in phase with the switching voltage VLX. In this scenario, feed-forward control is effective if the frequency of the regulating circuit 16A is greater than or equal to the frequency of the switched capacitor element 12A, thereby relieving the severe frequency constraint of separately controlled stages.

Additionally, the glitch capacitor CX, shown in FIG. 2, can be removed altogether if the dead-time interval DT of the switch capacitor element 12A occurs when the regulating circuit 16A is not drawing input current. Synchronizing the switched capacitor element 12A and the regulating circuit 16A ensures the proper timing between the dead-time interval DT and the interval during which the regulating circuit 16A is not drawing input current.

One more benefit of synchronizing the switched capacitor element 12A and the regulating circuit 16A is the ability to open and close the power switches S1-S8 in the switched capacitor element 12A when zero-current is flowing through the power switches S1-S8. This technique is often referred to as zero-current switching. To achieve zero-current switching, the dead-time interval DT must occur when the regulating circuit 16A is not drawing input current.

Figure 4:
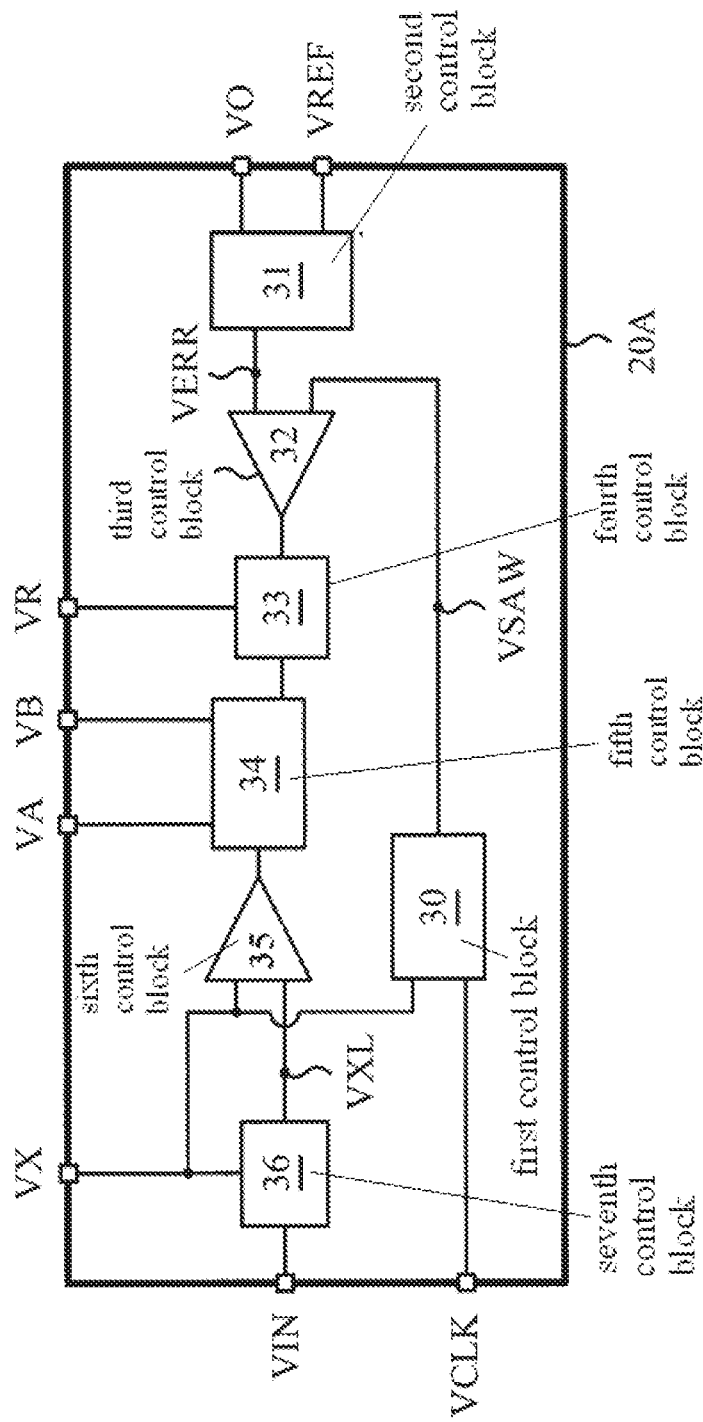
FIG. 4 shows a particular implementation of the controller in FIG. 3.

FIG. 4 illustrates a controller 20A that is a preferred embodiment of the first generic controller 20. The controller 20A can be separated into a first control section and a second control section. The control circuitry for the regulating circuit 16A is in the first control section and includes first, second, third, and fourth control blocks 30, 31, 32, 33. In contrast, the control circuitry for the switched capacitor element 12A is in the second control section and includes fifth, sixth, and seventh control blocks 34, 35, 36. The "link" between the fourth control block 33 and the fifth control block 34 enables synchronization of the first and second control sections.

Figure 5:
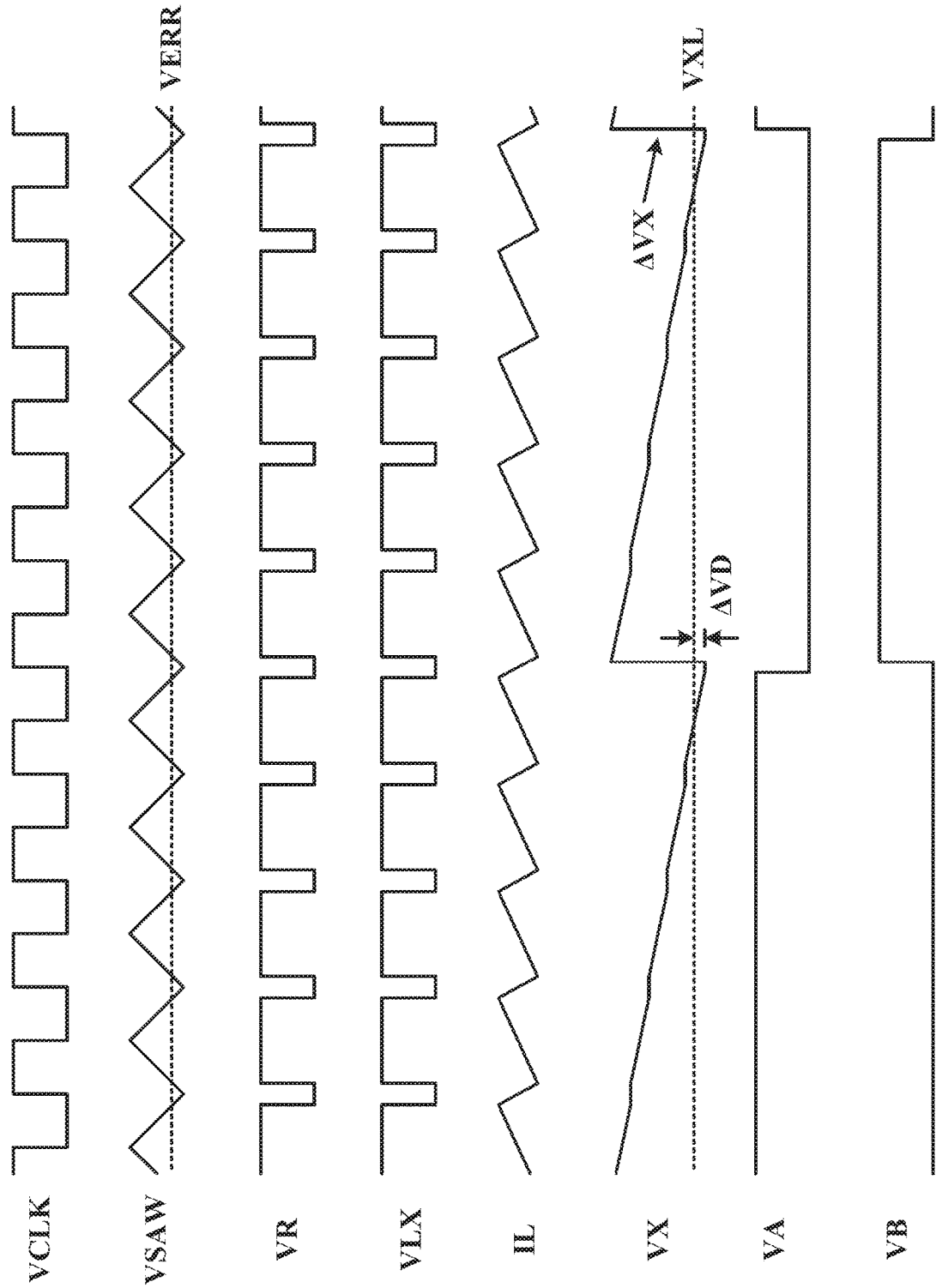
FIG. 5 shows a timing diagram of relevant signals from the embodiment in FIG. 4.
Figure 6:
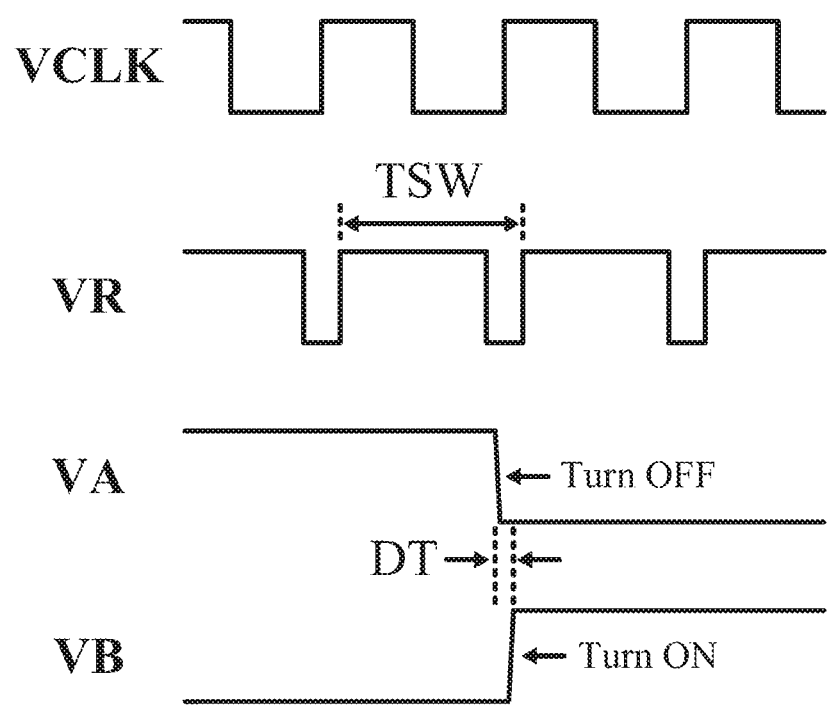
FIG. 6 shows a close-up of selected signals in FIG. 5.

In an effort to promote clarity in explaining the operation of the controller 20A, FIG. 5 illustrates some relevant signals generated by the controller 20A. The relevant signals include the clock voltage VCLK, a saw-tooth voltage VSAW, the regulation control voltage VR, the switching voltage VLX, a filter inductor current IL, the intermediate voltage VX, the first phase voltage VA, and the second phase voltage VB. Furthermore, FIG. 6 illustrates a close-up of some of the waveforms in FIG. 5, where the regulation control voltage period TSW is the inverse of the regulation control voltage VR frequency.

Referring back to FIG. 4, the first control section within the controller 20A uses a linear voltage-mode control scheme to control the regulating circuit 16A. The controller 20A compares the output voltage VO with the reference voltage VREF, thereby producing a residual voltage that is conditioned by the second control block 31. A resulting error voltage VERR is then fed into the third control block 32 where it is compared with the saw-tooth voltage VSAW. Lastly, the output of the third control block 32 is further conditioned by the fourth control block 33, resulting in the regulation control voltage VR.

The first control block 30 sets the frequency of the regulation control voltage VR by generating the saw-tooth voltage VSAW from the clock voltage VCLK. Additionally, the first control block 30 provides feed-forward control of the regulating circuit 16A by adjusting the peak voltage of the saw-tooth voltage VSAW based upon the intermediate voltage VX. Alternatively, feed-forward control can be implemented by adjusting the error voltage VERR with respect to the input voltage VIN or the intermediate voltage VX in the second control block 31.

The second control section within the controller 20A uses a hysteretic control scheme to control the switched capacitor element 12A. The controller 20A causes the first and second phase voltages VA, VB to cycle the switched capacitor element 12A back and forth between the first network state and the second network state based upon a hysteresis band.

During operation, the sixth control block 35 continuously compares the intermediate voltage VX with a trigger voltage VXL. When the intermediate voltage VX drops below the trigger voltage VXL, the fifth control block 34 is triggered and then waits for a confirmation signal. Once the fourth control block 33 sends a signal informing the fifth control block 34 that it is acceptable to make a state change, the dead-time interval DT, shown in FIG. 6, is initiated. During the dead-time interval DT, the first and second phase voltages VA, VB are set low. Following the dead-time interval DT, either the first phase voltage VA is set high and the second phase voltage VB is left low or the first phase voltage VA is left low and the second phase voltage VB is set high, depending upon the initial state. After the state change, the fifth control block 34 is reset and the sequence repeats.

The controller 20A thus forces the frequency of the switched capacitor element 12A to be submultiples of the frequency of the regulating circuit 16A. This constraint is illustrated in FIG. 5, where the frequencies of the first phase voltage VA and the second phase voltage VB are much lower than the frequency of the regulation control voltage VR. In some practices, the frequency of the second phase voltage VB is as little as a tenth that of the control voltage VR.

Since the switched capacitor element 12A is loaded down by a non-capacitive regulating circuit 16A, the voltage ripple on the intermediate voltage VX is a piecewise linear approximation of a saw-tooth waveform. As used herein, an intermediate peak-peak voltage ripple $\Delta VX$ is equal to the maximum intermediate voltage minus the minimum intermediate voltage under steady state conditions. Typically, the intermediate voltage VX comprises a high frequency component from the regulating circuit 16A superimposed on the lower frequency saw-tooth waveform from the switched capacitor element 12A.

Unfortunately, while the fifth control block 34 is waiting to change states, the intermediate voltage VX drops a delta voltage ΔVD below the trigger voltage VXL, as shown by the intermediate voltage VX curve in FIG. 5. Typically, the delta voltage ΔVD is small, especially if the frequency of the switched capacitor element 12A is much lower than the frequency of the regulating circuit 16A. The delta voltage ΔVD at most can be equal to one-half of the intermediate peak-peak voltage ripple ΔVX and this occurs when the frequency of the switched capacitor element 12A is equal to the frequency of the regulating circuit 16A.

Figure 7:
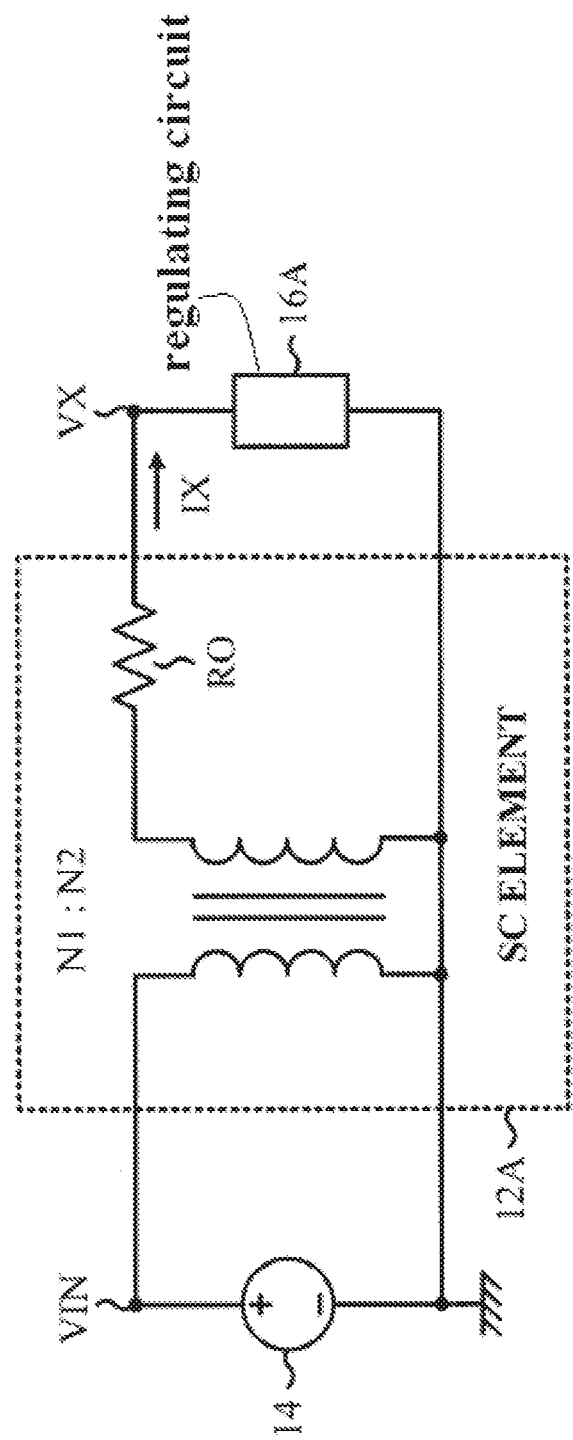
FIG. 7 shows a DC model of a switched capacitor element.

FIG. 7 illustrates a DC model of the switched capacitor element 12A coupled between the voltage source 14 and the regulating circuit 16A. The DC model includes a transformer with a finite output resistance RO. Assuming the switched capacitor element 12A delivers an intermediate current IX, the average of the intermediate voltage VX can be calculated using $$\overline{VX} = VIN\frac{N2}{N1} - IX \times RO.$$

The configuration of the switches and capacitors in the switched capacitor element 12A sets a voltage transformation ratio N1:N2. Meanwhile, the output resistance RO of the switched capacitor element 12A accounts for the energy loss in charging/discharging the pump capacitors.

Based upon the waveforms in FIG. 5, the average of the intermediate voltage VX can be calculated using $$\overline{VX}=VXL-\Delta VD+\Delta VX/2.$$

By equating the previous two equations, the intermediate peak-peak voltage ripple ΔVX can be expressed as $$\Delta VX = 2\left[VIN\frac{N2}{N1} - IX \times RO - VXL + \Delta VD\right].$$

Consequently, the intermediate peak-peak voltage ripple ΔVX is function of operating parameters such as the intermediate current IX and the input voltage VIN. Additionally, due to the synchronization constraint, the intermediate peak-peak voltage ripple ΔVX is also a function of the delta voltage ΔVD.

Unfortunately, large variations in the intermediate peak-peak voltage ripple ΔVX can overstress the regulating circuit 16A. To minimize variations of the intermediate peak-peak voltage ripple ΔVX, the trigger voltage VXL, shown in FIG. 4, can be adjusted on the fly. For example, the seventh control block 36 utilizes the input voltage VIN and the intermediate voltage VX to make a decision on the appropriate value of the trigger voltage VXL. Therefore, when the input voltage VIN rises, the trigger voltage VXL rises in step.

One key idea illustrated in FIG. 6 is that the dead-time interval DT occurs during the off state of the high-side power switch SH in FIG. 2. To ensure this outcome, there is an upper bound on the duty cycle of the regulating circuit 16A, where a maximum duty cycle DMAX is determined using $$DMAX = \frac{TSW - DT}{TSW}.$$

As illustrated by the equation above, the dead-time interval DT sets the maximum duty cycle DMAX. It is often desirable to minimize the dead-time interval DT, thereby widening the duty cycle range of the regulating circuit 16A.

It is not uncommon to have a duty cycle limit, specifically if constant frequency operation of the regulating circuit 16A is required for electromagnetic compatibility reasons. In these cases, the maximum duty cycle DMAX constraint is not overly burdensome because the feed-back control loop for the regulating circuit 16A would otherwise have a duty cycle limit.

Figure 8A:
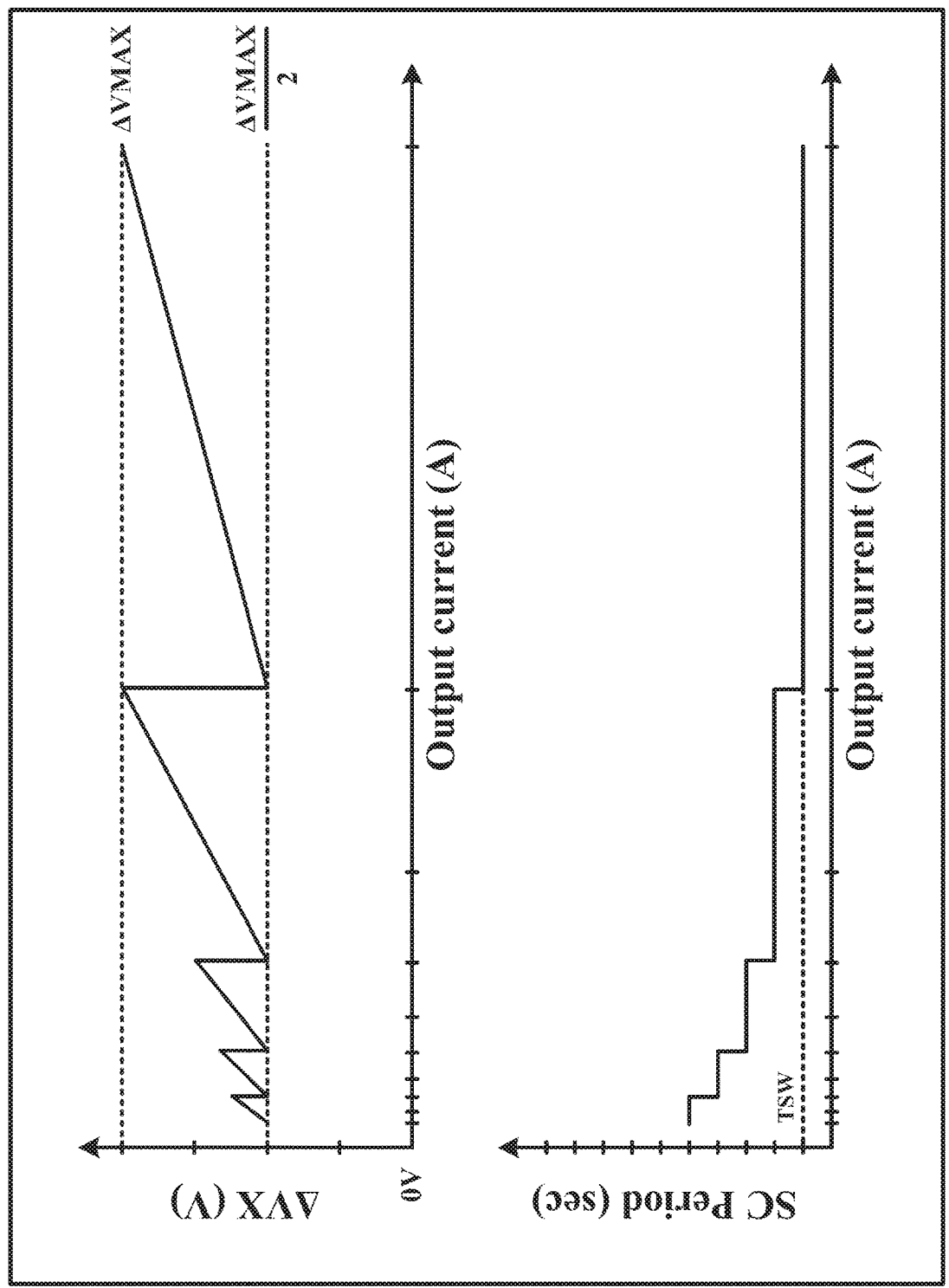
FIGS. 8A-8B show the relationship between the load current and the intermediate voltage ripple.

FIG. 8A illustrates the period of the switched capacitor element 12A and the intermediate peak-peak voltage ripple ΔVX as a function of the output current. As the output current decreases, the slope of the voltage ripple on the intermediate voltage VX decreases. This reduces the frequency of the first and second phase voltages VA, VB. Due to synchronization, the reduction in frequency occurs abruptly and only at specific output current values. The change in frequency takes place whenever the intermediate peak-peak voltage ripple ΔVX is equal to a maximum peak-peak voltage ripple ΔVMAX divided by two. Consequently, the intermediate peak-peak voltage ripple ΔVX follows a saw-tooth waveform with a fixed valley voltage. Furthermore, as the output current approaches zero, the intermediate peak-peak voltage ripple ΔVX approaches one-half of the maximum peak-peak voltage ripple ΔVMAX.

Figure 8B:
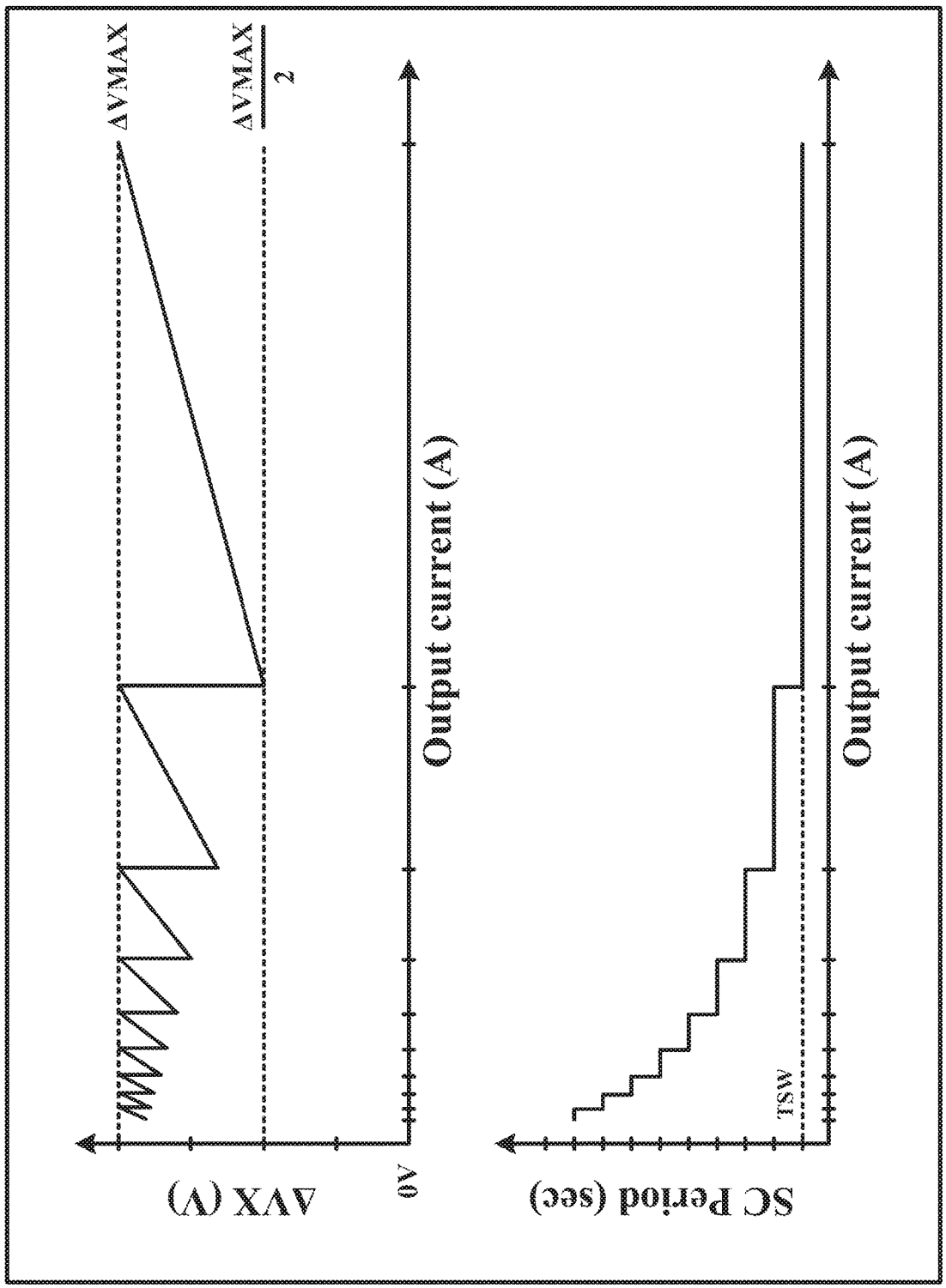

With a few modifications to the controller 20A, it is also possible to get the intermediate peak-peak voltage ripple ΔVX to follow a saw-tooth waveform with a fixed peak voltage as illustrated in FIG. 8B. In this scenario, as the output current approaches zero, the intermediate peak-peak voltage ripple ΔVX approaches the maximum peak-peak voltage ripple ΔVMAX. The main difference between the first approach in FIG. 8A and second approach in FIG. 8B is the distribution of frequencies and intermediate peak-peak voltage ripple ΔVX across the output current range.

The controller 20A depicted in FIG. 4 and described above is one of many possible implementations of the first generic controller 20 that can synchronize the power converter 10A or any power converter that includes a switched capacitor element 12A that precedes a regulating circuit 16A. In the modular multi-stage power converter architecture, the switched capacitor element 12A and the regulating circuit 16A can be mixed and matched in a variety of different ways. For example, FIG. 9 illustrates an alternative power converter 10B, wherein a regulating circuit 16A precedes a switched capacitor element 12A.

Figure 9:
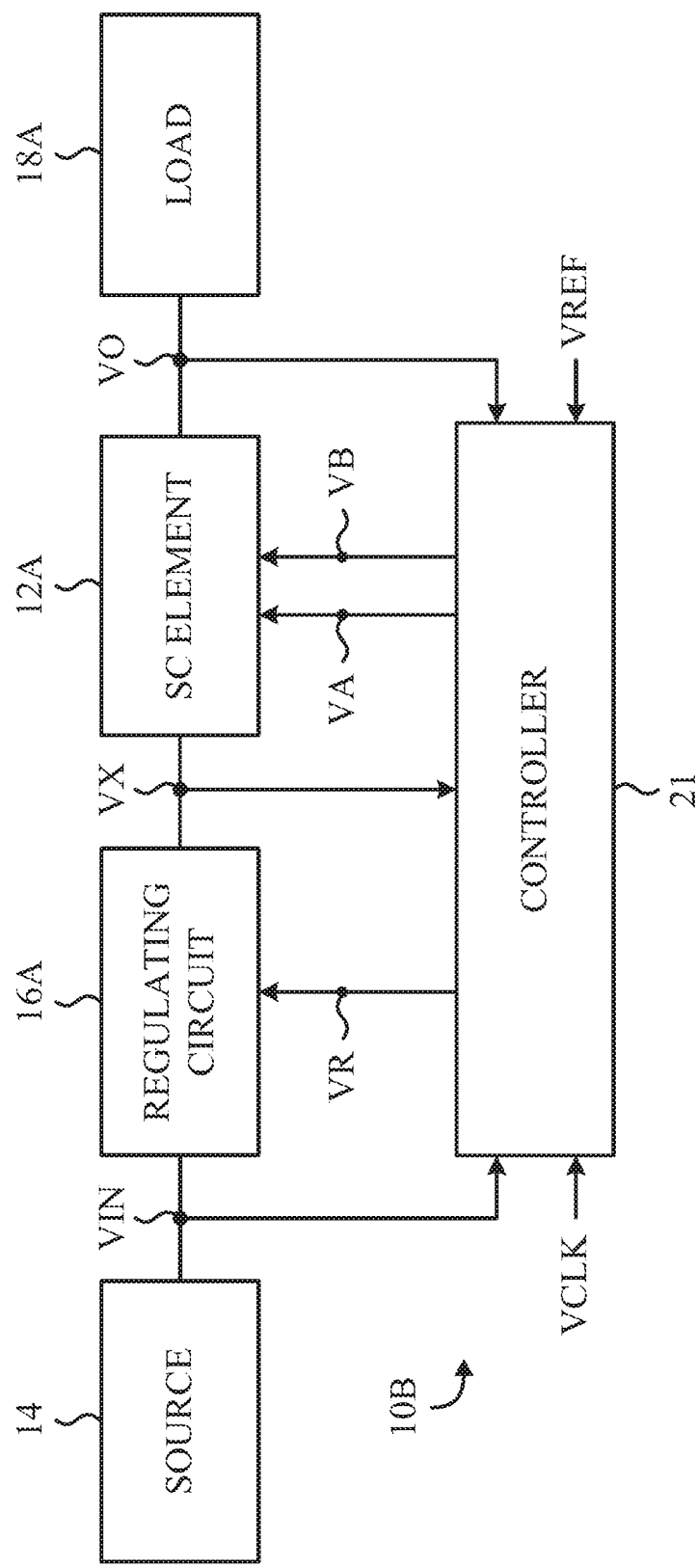
FIG. 9 shows a controller that synchronizes a regulating circuit that precedes a switched capacitor element.

In FIG. 9, a second generic controller 21 synchronizes the regulating circuit 16A and the switched capacitor element 12A. The input and output signals of the second generic controller 21 are the same as that of the first generic controller 20. In the power converter 10B, the regulating circuit 16A may include various types of switch-mode power converters, such as a boost converter, a resonant converter, and a fly-back converter. Similarly, the switched capacitor element 12A may include various types of switched capacitor converters, such as a series-parallel charge pump, a voltage doubler, and a cascade multiplier. Regardless of the selection of either the regulating circuit 16A or the switched capacitor element 12A, if the two stages are synchronized, the frequency of the switched capacitor element 12A will change in discrete steps as the output current of the power converter 10B is varied.

Figure 10:
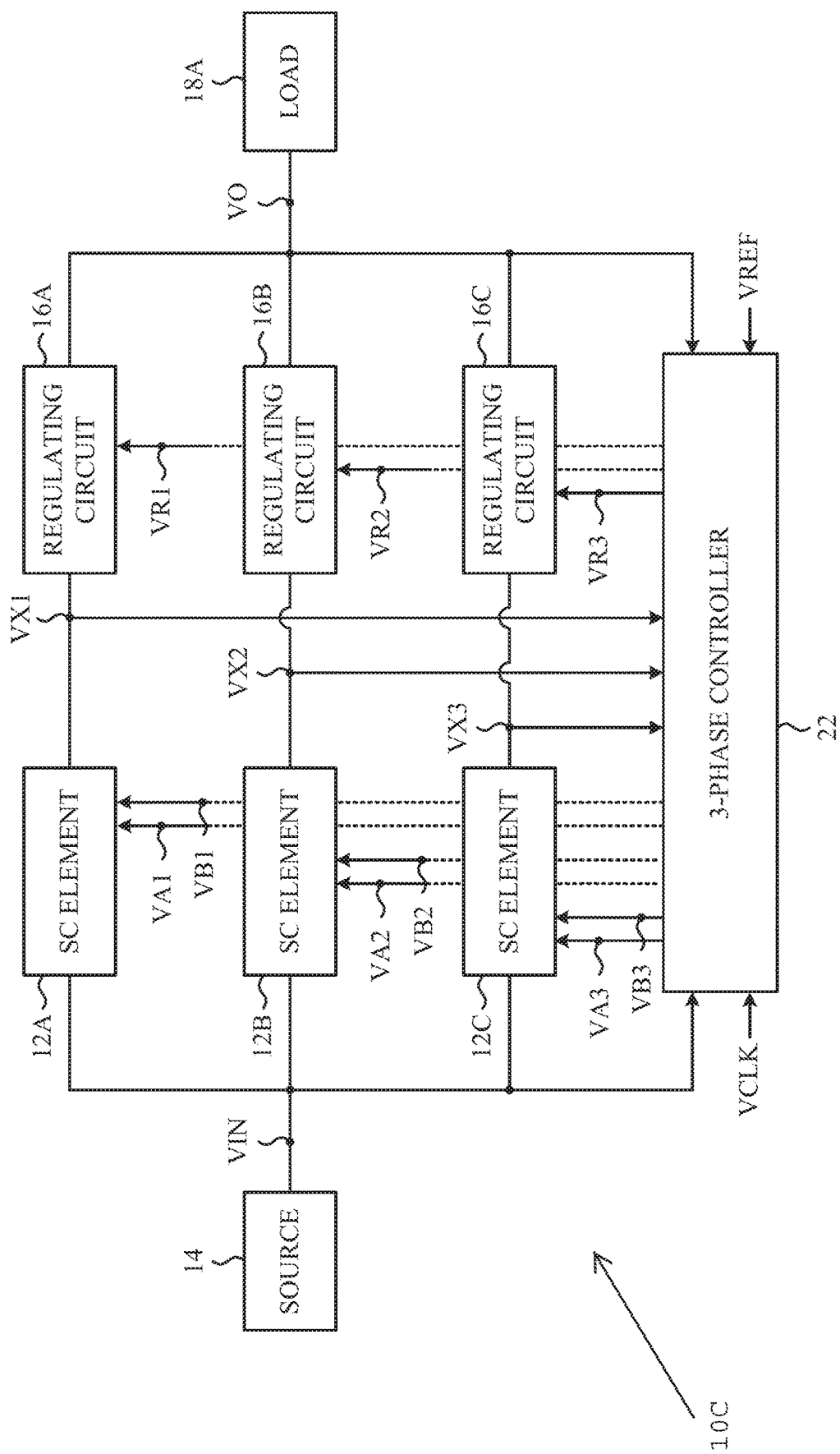
FIG. 10 shows a three-phase controller that synchronizes a three-phase switched capacitor element that precedes a three-phase regulating circuit.

In addition to alternative modular multi-stage power converter architectures, it is also possible to synchronize multi-phase implementations. FIG. 10 illustrates a three-phase power converter 10C and a generic three phase-controller 22 that synchronizes the various stages. The three-phase power converter 10C includes three regulating sub-elements: a first regulating circuit 16A, a second regulating circuit 16B, a third regulating circuit 16C and three voltage transformation sub-elements: a first switched capacitor element 12A, a second switched capacitor element 12B, and a third switched capacitor element 12C. The first, second, and third switched capacitor elements 12A, 12B, 12C provide first, second, and third intermediate voltages VX1, VX2, VX3, respectively.

First, second, and third regulation control voltages VR1, VR2, VR3 control the first, second, and third regulating circuits 16A, 16B, 16C, respectively. Furthermore, first and second phase voltages VA1, VB1 control the first switched capacitor element 12A; third and fourth phase voltages VA2, VB2 control the second switched capacitor element 12B; and fifth and sixth phase voltages VA3, VB3 control the third switched capacitor element 12C. Additionally, a regulation control bus BVR includes the first, second, and third regulation control voltages VR1, VR2, VR3. A first phase bus BVA includes the first, third, and fifth phase voltages VA1, VA2, VA3. Lastly, a second phase bus BVB includes the second, fourth, and sixth phase voltages VB1, VB2, VB3.

Figure 11:
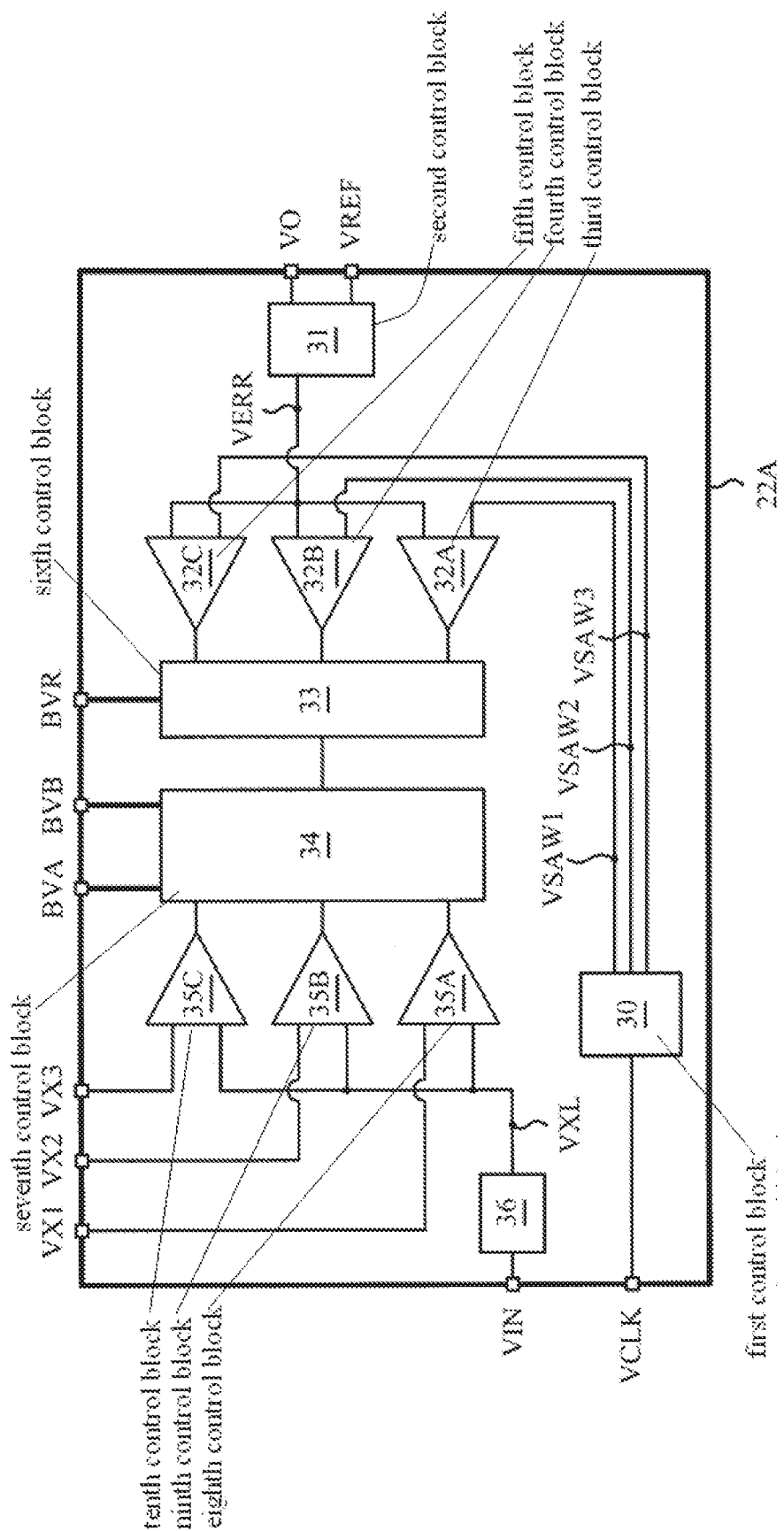
FIG. 11 shows a particular implementation of the three-phase controller in FIG. 10.

FIG. 11 illustrates a three-phase controller 22A that is a preferred embodiment of the generic three-phase controller 22. The three-phase controller 22A can be separated into a first control section and a second control section. The control circuitry for the first, second, and third regulating circuits 16A, 16B, 16C is in the first control section and includes first, second, third, fourth, fifth, and sixth control blocks 30, 31, 32A, 32B, 32C, 33. In contrast, the control circuitry for the first, second, and third switched capacitor elements 12A, 12B, 12C is in the second control section and includes seventh, eighth, ninth, tenth, and eleventh control blocks 34, 35A, 35B, 35C, 36.

The three-phase controller 22A looks very similar to the controller 20A in FIG. 4, but with additional input and output signals. In the three-phase controller 22A, a linear voltage-mode control scheme is used to control the regulating circuits 16A-16C and a hysteretic control scheme is used to control the switched capacitor elements 12A-12C. Consequently, the operation of the first and second control sections in the three-phase controller 22A is similar to that described in connection with FIG. 4.

In the first control section, the first control block 30 sets the frequency and phase of the first, second, and third regulation control voltages VR1, VR2, VR3. The first control block 30 generates first, second, and third saw-tooth voltages VSAW1, VSAW2, VSAW3 that are compared to an error voltage VERR by the third, fourth, and fifth control blocks 32A, 32B, 32C, respectively. The resulting three outputs are further conditioned by the sixth control block 33 that produces the regulation control bus BVR.

In the second control section, the first, second, and third intermediate voltages VX1, VX2, VX3 are compared to a trigger voltage VXL produced by the eleventh control block 36. The output of the eighth, ninth, tenth control blocks 35A, 35B, 35C are further conditioned by the seventh control block 34 resulting in the first and second phase buses BVA, BVB. The 'link' between the sixth control block 33 and the seventh control block 34 enables synchronization of the first and second control sections.

Figure 12A:
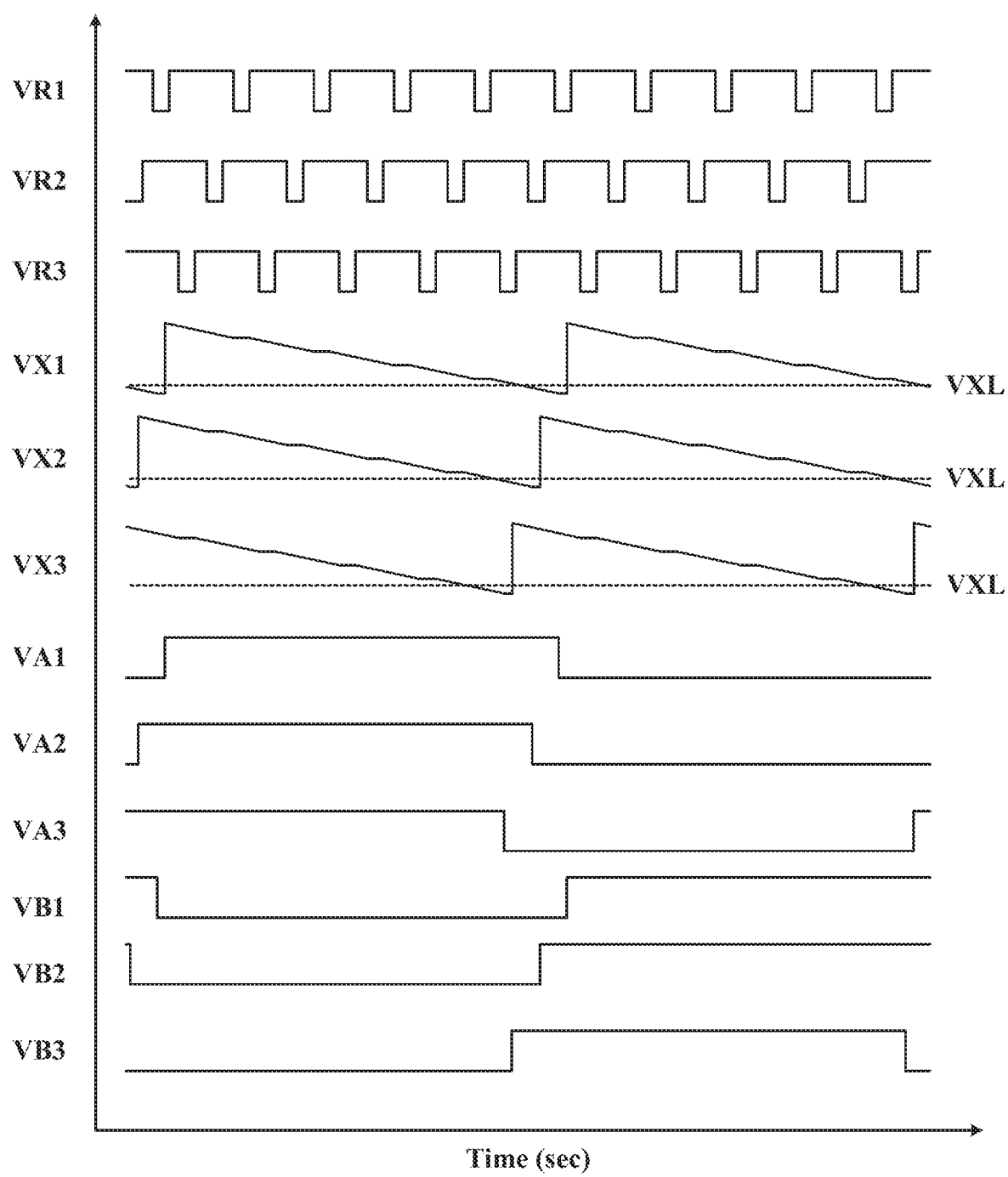
FIGS. 12A-12B show timing diagrams of relevant signals from the embodiment in FIG. 11.

In an effort to promote clarity, FIG. 12A illustrates some relevant signals generated by the three-phase controller 22A. The first, second, and third regulation control voltages VR1, VR2, VR3 are one hundred and twenty degrees out of phase with each other. Meanwhile, the phase voltages VA1, VA2, VA3 are shifted in time with respect to each other the same amount as their corresponding regulation control voltages VR1, VR2, VR3 are shifted in time with respect to each other. Furthermore, the second, fourth, and sixth phase voltages VB1, VB2, VB3 are one hundred and eighty degrees out of phase with the first, third, and fifth phase voltages VA1, VA2, VA3, respectively.

For example, if the frequency of the first, second, and third regulating circuits 16A, 16B, 16C is one megahertz, then the rising and/or falling edges of the first, second, and third regulation control voltages VR1, VR2, VR3 are separated by one-third of a microsecond. Consequently, the rising and/or falling edges of the first, third, and fifth phase voltages VA1, VA2, VA3 are separated by one-third of a microsecond and the rising and/or falling edges of the second, fourth, and sixth phase voltages VB1, VB2, VB3 are separated by one-third of a microsecond.

Figure 12B:
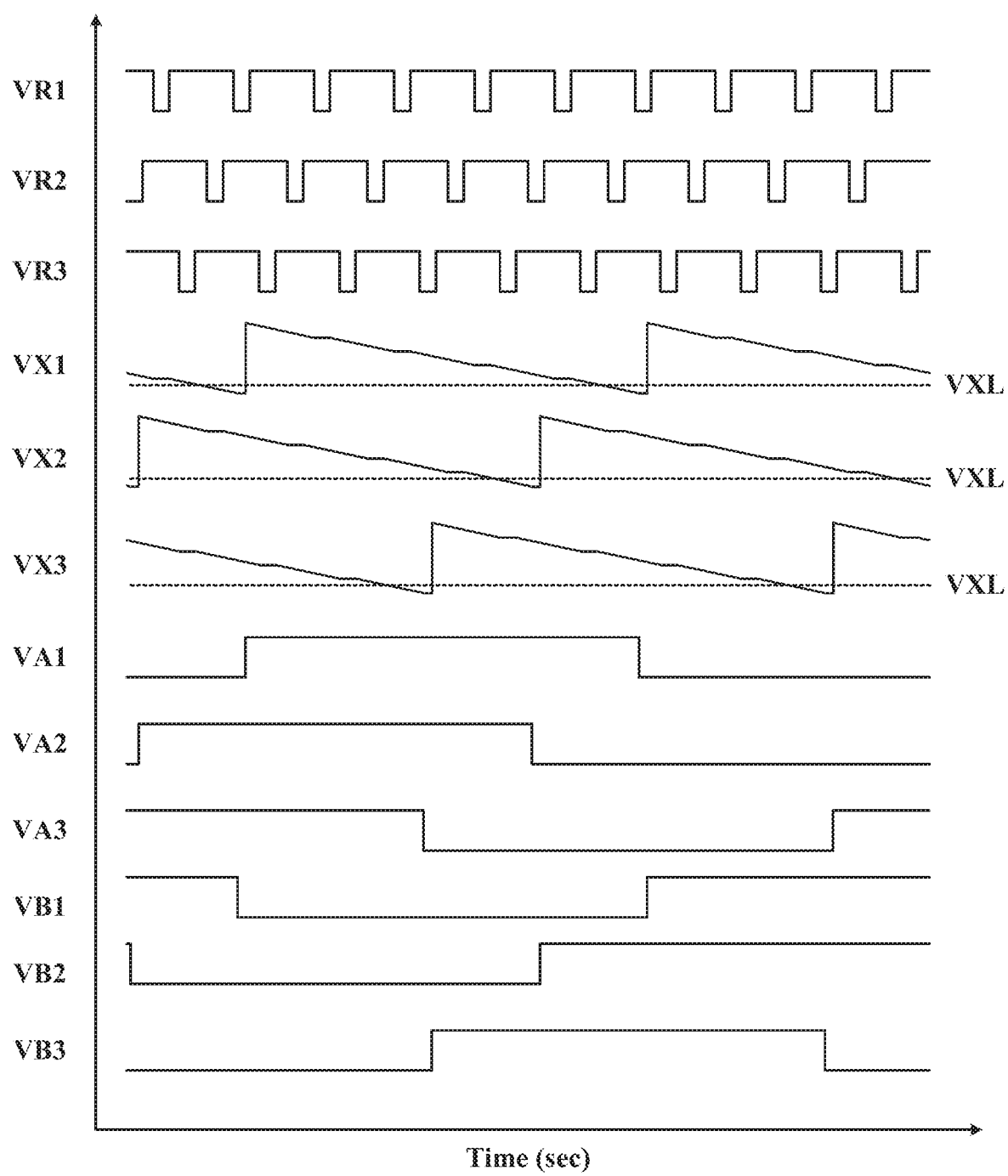

With a few modifications to the three-phase controller 22A, it is possible to further shift the first, third, and fifth phase voltages VA1, VA2, VA3 by one or more whole periods of the regulating circuits 16A-16C as illustrated in FIG. 12B.

For example, if the frequency of each of the regulating circuits 16A-16C is one megahertz, then the period of each of the regulating circuits 16A-16C is one microsecond. Assuming a shift of one period, then the rising and/or falling edges of the first, third, and fifth phase voltages VA1, VA2, VA3 are separated by one and one-third of a microsecond and the rising and/or falling edges of the second, fourth, and sixth phase voltages VB1, VB2, VB3 are separated by one and one-third of a microsecond. Among other benefits, the more uniform spacing of the first intermediate voltage VX1 ripple, the second intermediate voltage VX2 ripple, and the third intermediate voltage VX3 ripple reduces their effect on the output voltage VO.

As in the single-phase case, the glitch capacitor CX can be removed altogether if the dead-time interval DT of each of the switched capacitor elements 12A, 12B, 12C occurs when their corresponding regulating circuits 16A, 16B, 16C are neither sinking nor sourcing current through an inductive element. For example, in a buck converter, the filter inductor is sinking current from the input only a portion of the time, whereas, in a boost converter, the filter inductor is sourcing current to the output only a portion of the time. These power converters have a discontinuous current interval during which current is either sunk or sourced. Therefore, the glitch capacitor CX is unnecessary if the dead-time interval DT of each of the switched capacitor elements 12A, 12B, 12C occurs during the discontinuous input current interval.

Both the controller 20A in FIG. 4 and the three-phase controller 22A in FIG. 11 utilize linear voltage-mode control. However, other control techniques such as non-linear voltage-mode control, peak current-mode control, and average current-mode control are applicable as well.

The control circuitry described herein synchronizes the switched capacitor elements 12A with the regulating circuits 16A in the modular multi-stage power converter architecture. Among other advantages, the control circuitry described herein provides a way to minimize the effect of the intermediate voltage VX ripple on the output voltage VO and minimize the production of a voltage 'glitch' during the dead-time internal DT of the switched capacitor element 12A.

Various features, aspects, and embodiments of control techniques for power converters that utilize capacitors to transfer energy have been described herein. The features, aspects, and numerous embodiments described are susceptible to combination with one another as well as to variation and modification, as will be understood by those having ordinary skill in the art. The present disclosure should, therefore, be considered to encompass such combinations, variations, and modifications. Additionally, the terms and expression which have been employed herein are used as terms to description and not of limitation, and there is no intention, in the use of such terms and expression, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

Having described the invention, and a preferred embodiment thereof, what is claimed as new and secured by Letters Patent is:

1. A power converter, comprising:
   a voltage converting circuit, wherein at least an output voltage of the voltage converting circuit is regulated in response to a first signal; and
   a switched capacitor circuit coupled to the voltage converting circuit, the switched capacitor circuit comprising at least one capacitor and a plurality of switches being switched substantially in accordance with a switching frequency;
   wherein the switched capacitor circuit is a multiple phase circuit comprising a first switched capacitor element associated with a first phase voltage and a second switched capacitor element associated with a second phase voltage out of phase with the first phase voltage, and each of the first switched capacitor element and the second switched capacitor element changes between a first network state and a second network state in response to one or more second signals to alternatively charge or discharge the at least one capacitor;
   wherein the first switched capacitor element and the second switched capacitor element provide an output voltage of the switched capacitor circuit to a node in both the first network state and the second network state, and the switched capacitor circuit and the voltage converting circuit are synchronized based, at least in part, on a dead-time interval associated with the switched capacitor circuit.

2. The power converter of claim 1, further comprising:
   a controller coupled to the voltage converting circuit and the switched capacitor circuit to generate the first signal and one or more second signals.

3. The power converter of claim 2, wherein the controller is to synchronize the switched capacitor circuit and the voltage converting circuit by setting a period of the switched capacitor circuit at least in part based on a period of the voltage converting circuit.

4. The power converter of claim 2, wherein the controller is configured to compare the output voltage of the voltage converting circuit with a trigger voltage to trigger initiation of a dead-time interval, wherein the trigger voltage is adjustable on the fly.

5. The power converter of claim 1, wherein at least one of the first switched capacitor element or the second switched capacitor element is coupled to a voltage source.

6. The power converter of claim 1, wherein the at least one capacitor is to provide an output current.

7. The power converter of claim 1, wherein the first signal and the one or more second signals are generated in response to one or more voltage signals associated with the switched capacitor circuit and the voltage converting circuit.

8. The power converter of claim 7, wherein the one or more voltage signals comprise a reference voltage, an output voltage, an intermediate voltage, an input voltage, or any combination thereof.

9. The power converter of claim 1, wherein at least one of the first switched capacitor element or the second switched capacitor element comprises a series-parallel charge pump, a voltage doubler, a cascade multiplier, or any combination thereof.

10. The power converter of claim 1, wherein the power converter provides power to a load, the load comprising at least a data processing unit, a memory, a display, a wireless transmitter, a wireless receiver, or any combination thereof, wherein the switched capacitor circuit and the voltage converting circuit are synchronized, at least in part, to facilitate power consumption by the load.

11. The power converter of claim 1, wherein switches in the first switched capacitor element are open during a dead-time interval of the first switched capacitor element between the first network state and the second network state of the first switched capacitor element.

12. The power converter of claim 11, wherein the dead-time interval occurs in a period that the voltage converting circuit draws zero input current.

13. The power converter of claim 1, wherein the switching frequency of the switched capacitor circuit is set to facilitate zero current switching (ZCS) of one or more switches within the switched capacitor circuit.

14. The power converter of claim 1, wherein the switching frequency of the switched capacitor circuit is a submultiple of the frequency of the voltage converting circuit.

15. A power converter, comprising:
   a regulating circuit to provide a regulating circuit output voltage in response to an input voltage received by the regulating circuit, wherein the regulating circuit output voltage is regulated in response to a first signal; and
   a switched capacitor circuit coupled to the regulating circuit, the switched capacitor circuit being a multiple phase circuit having multiple paths associated with corresponding voltages out of phase with each other, the switched capacitor circuit comprising at least one capacitor and a plurality of switches being switched substantially in accordance with a switching frequency to alternatively charge or discharge the at least one capacitor based, at least in part, on a dead-time interval associated with the switched capacitor circuit;
   wherein the switching frequency varies in response to an output current of the power converter.

16. The power converter of claim 15, wherein the switching frequency is switched from a first frequency to a second frequency greater than the first frequency when the output current reaches a first threshold.

17. The power converter of claim 16, wherein the switching frequency is switched from the second frequency to a third frequency greater than the second frequency when the output current reaches a second threshold greater than the first threshold.

18. The power converter of claim 15, wherein the switching frequency changes in discrete steps as the output current of the power converter is varied.

19. The power converter of claim 15, further comprising:
a controller coupled to the regulating circuit and the switched capacitor circuit to generate the first signal and one or more second signals.

20. The power converter of claim 19, wherein the controller is to adjust the switching frequency by the one or more second signals.

21. The power converter of claim 19, wherein the controller is configured to compare the regulating circuit output voltage with a trigger voltage to trigger initiation of a dead-time interval, wherein the trigger voltage is adjustable on the fly.

22. The power converter of claim 15, wherein the first signal is generated in response to one or more voltage signals associated with the regulating circuit.

23. The power converter of claim 22, wherein the one or more voltage signals comprise a reference voltage, an output voltage, the regulating circuit output voltage, an input voltage, or any combination thereof.

24. The power converter of claim 15, wherein the switched capacitor circuit comprises a series-parallel charge pump, a voltage doubler, a cascade multiplier, or any combination thereof.

25. The power converter of claim 15, wherein the power converter provides power to a load, the load comprising at least a data processing unit, a memory, a display, a wireless transmitter, a wireless receiver, or any combination thereof, wherein the switched capacitor circuit and the regulating circuit are synchronized, at least in part, to facilitate power consumption by the load.

26. The power converter of claim 15, wherein the plurality of switches change between a first network state and a second network state in response to one or more second signals to alternatively charge or discharge the at least one capacitor,
wherein a first time period of the first network state and a second time period of the second network state in one cycle vary in response to the output current.

27. The power converter of claim 15, wherein the switches in the switched capacitor circuit comprising a plurality of first switches being closed in a first network state and a plurality of second switches being closed in a second network state, and the first switches and the second switches are open during a dead-time interval between the first network state and the second network state.

28. The power converter of claim 27, wherein the dead-time interval occurs in a period that the regulating circuit draws zero input current.

29. The power converter of claim 15, wherein the switching frequency of the switched capacitor circuit is set to facilitate zero current switching (ZCS) of one or more switches within the switched capacitor circuit.

30. The power converter of claim 15, wherein the switching frequency of the switched capacitor circuit is a submultiple of a frequency of the regulating circuit.

31. A power converter, comprising:
two or more switching networks, each switching network associated with a phase voltage, wherein each phase voltage is out of phase with each other, and any of the two or more switching networks comprising at least one capacitor and a plurality of switches being switched substantially in accordance with a switching frequency to alternatively charge or discharge the at least one capacitor;

a multi-phase regulating circuit having a plurality of paths and coupled to the two or more switching networks, wherein a first path of the plurality of paths is coupled to a corresponding first switching network of the two or more switching networks and wherein a second path of the plurality of paths is coupled to a corresponding second switching network of the two or more switching networks; and
a controller coupled to the multi-phase regulating circuit and the one or more switching networks to control the multi-phase regulating circuit and the one or more switching networks in response to feedback signals from one or more nodes of the power converter.

32. The power converter of claim 31, wherein the one or more switching networks comprising a first switching capacitor network and a second switching capacitor network in parallel.

33. The power converter of claim 31, wherein the controller comprises a control loop to compare an output voltage with a reference voltage to produce an error voltage.

34. The power converter of claim 31, wherein the controller is to output one or more regulation control voltages to the multi-phase regulating circuit.

35. The power converter of claim 34, wherein the one or more regulation control voltages are provided to a driver stage to selectively open or close a low-side switch and a high-side switch in the multi-phase regulating circuit.

36. The power converter of claim 34, wherein the one or more regulation control voltages comprise two or more regulation control voltages out of phase with each other.

37. The power converter of claim 36, wherein two or more phase voltages associated with the one or more switching networks are shifted in time with respect to each other the same amount as the two or more regulation control voltages.

38. The power converter of claim 34, wherein a switching frequency of the one or more regulation control voltages are set in response to a clock voltage received by the controller.

39. The power converter of claim 31, wherein the controller utilizes a linear voltage-mode control, a non-linear voltage-mode control, a peak current-mode control, an average current-mode control, or any combination thereof.

40. An integrated circuit of a switched capacitor circuit, the switched capacitor circuit being a multiple phase circuit having multiple paths associated with corresponding voltages out of phase with each other, the switched capacitor circuit having at least one capacitor and being coupled to a regulating circuit providing, in response to an input voltage, a regulating circuit output voltage regulated based on a first signal, the integrated circuit comprising:
a plurality of switches within the integrated circuit being switched substantially in accordance with a switching frequency to change between a first network state and a second network state to alternatively charge or discharge the at least one capacitor coupled to one or more of the plurality of switches based, at least in part, on a dead-time interval associated with the switched capacitor circuit, wherein the switching frequency varies in response to an output current of the integrated circuit.

41. The integrated circuit of claim 40, wherein the switching frequency is switched from a first frequency to a second frequency greater than the first frequency when the output current reaches a first threshold.

42. The integrated circuit of claim 41, wherein the switching frequency is switched from the second frequency to a third frequency greater than the second frequency when the output current reaches a second threshold greater than the first threshold.

43. The integrated circuit of claim 40, wherein the switching frequency changes in discrete steps as the output current is varied.

44. The integrated circuit of claim 40, wherein the first signal and one or more second signals are generated by a controller coupled to the regulating circuit and the switched capacitor circuit.

45. The integrated circuit of claim 44, wherein the controller is to adjust the switching frequency by the one or more second signals.

46. The power converter of claim 44, wherein the controller is configured to compare the regulating circuit output voltage with a trigger voltage to trigger initiation of a dead-time interval, wherein the trigger voltage is adjustable on the fly.

47. The integrated circuit of claim 40, wherein the first signal is generated in response to one or more voltage signals associated with the regulating circuit.

48. The integrated circuit of claim 47, wherein the one or more voltage signals comprise a reference voltage, an output voltage, the regulating circuit output voltage, an input voltage, or any combination thereof.

49. The integrated circuit of claim 40, wherein the switched capacitor circuit comprises a series-parallel charge pump, a voltage doubler, a cascade multiplier, or any combination thereof.

50. The integrated circuit of claim 40, wherein the power converter provides power to a load, the load comprising at least a data processing unit, a memory, a display, a wireless transmitter, a wireless receiver, or any combination thereof, wherein the switched capacitor circuit and the regulating circuit are synchronized, at least in part, to facilitate power consumption by the load.

51. The power converter of claim 40, wherein the plurality of switches comprising a plurality of first switches being closed in the first network state and a plurality of second switches being closed in the second network state, and the first switches and the second switches are open during a dead-time interval between the first network state and the second network state.

52. The power converter of claim 51, wherein the dead-time interval occurs in a period that the regulating circuit draws zero input current.

53. The power converter of claim 40, wherein the switching frequency is set to facilitate zero current switching (ZCS) of one or more of the plurality of switches within the integrated circuit.

54. The power converter of claim 40, wherein the switching frequency of the plurality of switches is a submultiple of a frequency of the regulating circuit.

* * * * *

UNITED STATES PATENT AND TRADEMARK OFFICE
CERTIFICATE OF CORRECTION

PATENT NO. : 11,936,300 B2
APPLICATION NO. : 17/491983
DATED : March 19, 2024
INVENTOR(S) : David Giuliano Page 1 of 1

It is certified that error appears in the above-identified patent and that said Letters Patent is hereby corrected as shown below:

On the Title Page

Item (73) Assignee Name, change "pSemi Corporation, LLC" to --pSemi Corporation--.

Signed and Sealed this
Twenty-fourth Day of September, 2024

Katherine Kelly Vidal
*Director of the United States Patent and Trademark Office*